(12) United States Patent
Chien et al.

(10) Patent No.: US 7,757,795 B2
(45) Date of Patent: Jul. 20, 2010

(54) DUAL WHEELEND FOR A VEHICLE

(75) Inventors: Daniel Chien, Franklin, MI (US); Alexandru Florea, Grand Rapids, MI (US); Tim G. Langlitz, Oshkosh, WI (US); Ken L. Phillipi, Oshkosh, WI (US); Craig R. Roble, Oshkosh, WI (US)

(73) Assignee: Axletech International IP Holdings, LLC, Troy, MI (US)

( * ) Notice: Subject to any disclaimer, the term of this patent is extended or adjusted under 35 U.S.C. 154(b) by 410 days.

(21) Appl. No.: 11/766,952

(22) Filed: Jun. 22, 2007

(65) Prior Publication Data
US 2008/0315671 A1    Dec. 25, 2008

(51) Int. Cl.
*B62D 61/10* (2006.01)
(52) U.S. Cl. .................................. 180/24.03
(58) Field of Classification Search ............. 180/24.03, 180/342, 343, 370, 371, 383, 385; 301/36.1, 301/36.2
See application file for complete search history.

(56) References Cited

U.S. PATENT DOCUMENTS

| | | | |
|---|---|---|---|
| 2,132,029 A * | 10/1938 | Higbee | ................... 188/18 A |
| 2,135,568 A | 11/1938 | Durham et al. | |
| 2,192,023 A | 2/1940 | Ash | |
| 2,239,674 A | 4/1941 | Frederickson | |
| 2,267,362 A | 12/1941 | Ash | |
| 2,507,134 A | 5/1950 | Ash | |
| 2,773,723 A | 12/1956 | Randall | |
| 6,254,193 B1 | 7/2001 | Bowman et al. | |
| 6,298,932 B1 | 10/2001 | Bowman et al. | |
| 6,345,868 B1 | 2/2002 | Bowman et al. | |
| 6,419,325 B1 | 7/2002 | Bowman et al. | |
| 6,471,301 B1 | 10/2002 | Johnson | |
| 6,527,073 B1 * | 3/2003 | Bowman et al. | .......... 180/24.03 |
| 6,890,039 B2 | 5/2005 | Chung | |

* cited by examiner

*Primary Examiner*—Paul N Dickson
*Assistant Examiner*—Robert A Coker
(74) *Attorney, Agent, or Firm*—Howard & Howard Attorneys PLLC

(57) ABSTRACT

An axle assembly for a vehicle comprising a stationary spindle and a rotatable axle shaft. An intermediate hub is supported on the spindle. Adjacent inner and outer wheel hubs are supported on the intermediate hub. A differential mechanism interconnects the inner and outer wheel hubs for driving both of the wheel hubs and for permitting relative rotation between the wheel hubs. At least one differential bushing is disposed between the differential mechanism and the intermediate hub. A gear reduction system interconnects the intermediate hub and the axle shaft for providing torque multiplication. A wet disc brake device is coupled between the spindle and the intermediate hub.

57 Claims, 11 Drawing Sheets

DUAL WHEELEND FOR A VEHICLE

BACKGROUND OF THE INVENTION

1. Field of the Invention

The subject invention relates to an axle assembly having a dual wheelend at each end of an axle shaft in which one wheel hub is permitted to rotate relative to the other wheel hub.

2. Description of Related Art

Axle assemblies having dual wheelends on both ends of an axle shaft have been used to increase the load bearing capability of trailers and heavy duty vehicles. Typically, the pair of wheels on each end of the axle assembly are secured together such that each pair of wheels rotates together as a unit.

Some of the dual wheelends for the heavy duty vehicles are driven and are therefore more complex and more difficult to design. Further, some of the heavy duty vehicles, such as lift trucks, undergo numerous turning maneuvers which produces significant wear on the tires. Specifically, the wear on the tires occurs when at least one of the tires scrub, or drag, during a turn. This phenomenon occurs because, although the tires are secured together, the tires must travel different distances at the inside and outside of the turning radius. Tire wear and maintenance on heavy duty lift trucks due to scrub creates a significant yearly cost to the user of these vehicles.

Dual wheelends have been developed that permit each wheel hub to rotate relative to each other to reduce scrubbing during vehicle turns. Also, such as disclosed in U.S. Pat. No. 6,419,325, some of these dual wheelends are designed to drive one of the wheel hubs. Certain driving conditions require that both of the wheel hubs be driven to provide enough traction to propel the heavy vehicle. There have been dual wheelends developed to satisfy this need and these dual wheelends typically utilize a differential mechanism disposed between the wheel hubs such that both wheel hubs may be driven at the same rate when the vehicle travels in a straight path. The differential mechanism permits the wheel hubs to rotate relative to each other when the vehicle travels in a curved path to reduce scrubbing. Examples of driven dual wheelends with differential mechanisms are disclosed in U.S. Pat. Nos. 6,254,193 and 6,471,301.

Although driven dual wheelends have been contemplated, there remains a need to develop a commercially viable design that can withstand the rigors of use and that incorporates all of a customer's desired features. Further, driven dual wheelends experience significant loads during operation and a design must be developed to support and/or transfer these loads away from the wearable components of the wheelend.

SUMMARY OF THE INVENTION AND ADVANTAGES

The subject invention sets forth an axle assembly for a vehicle comprising a stationary spindle defining a central bore and adapted for coupling to the vehicle. A rotatable axle shaft is disposed within the bore and terminates at a distal end with the axle shaft defining a rotational axis. A drive gear is mounted to the distal end of the axle shaft for rotation with the axle shaft. An intermediate hub is supported on the spindle and is coupled to the drive gear for rotation about the rotational axis during rotation of the axle shaft. An inner wheel hub is supported on the intermediate hub for rotation about the rotational axis. An outer wheel hub is adjacent to the inner wheel hub and is supported on the intermediate hub for rotation about the rotational axis. A differential mechanism interconnects the inner wheel hub and the outer wheel hub. The differential mechanism is at least partially mounted to the intermediate hub for driving both of the wheel hubs during rotation of the axle shaft and for permitting relative rotation between the wheel hubs relative to the intermediate hub when the vehicle travels in a curved path. A gear reduction system interconnects the intermediate hub and the drive gear for providing torque multiplication to the wheel hubs when driven by the axle shaft. A wet disc brake device is coupled between the spindle and the intermediate hub. The wet disc brake device includes first and second sets of friction discs adjacent one another in an alternating relationship defining a running clearance therebetween. The first set of friction discs is coupled to the spindle and in interlocking and sliding relationship relative to the spindle. The second set of friction discs is coupled to the intermediate hub and in interlocking and sliding relationship relative to the intermediate hub for rotating relative to the first set of friction discs in conjunction with the intermediate hub.

The subject invention also sets forth a dual wheelend for the axle assembly of a heavy vehicle. The wheelend comprises the stationary spindle defining a central bore and a first rotational axis with the spindle adapted for coupling to the vehicle. The intermediate hub is supported on the spindle for rotation about the first rotational axis during rotation of the axle shaft. The inner wheel hub is supported on the intermediate hub for rotation about the first rotational axis. The outer wheel hub is adjacent to the inner wheel hub and is supported on the intermediate hub for rotation about the first rotational axis. The differential mechanism interconnects the inner wheel hub and the outer wheel hub. The differential mechanism defines a second rotational axis transverse to the first rotational axis and is at least partially mounted to the intermediate hub for driving both of the wheel hubs during rotation of the axle shaft and for permitting relative rotation between the wheel hubs relative to the intermediate hub when the vehicle travels in a curved path. At least one differential bushing is disposed between the differential mechanism and the intermediate hub with the differential bushing substantially aligned with the second rotational axis for supporting axial loads substantially parallel to the first rotational axis.

Accordingly, the subject invention provides an axle assembly that is commercially viable, can withstand the rigors of use, and incorporates all of a customer's desired features. Further, the subject invention provides a dual wheelend capable of withstanding significant operating loads while transferring these loads from the wearable components of the wheelend.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
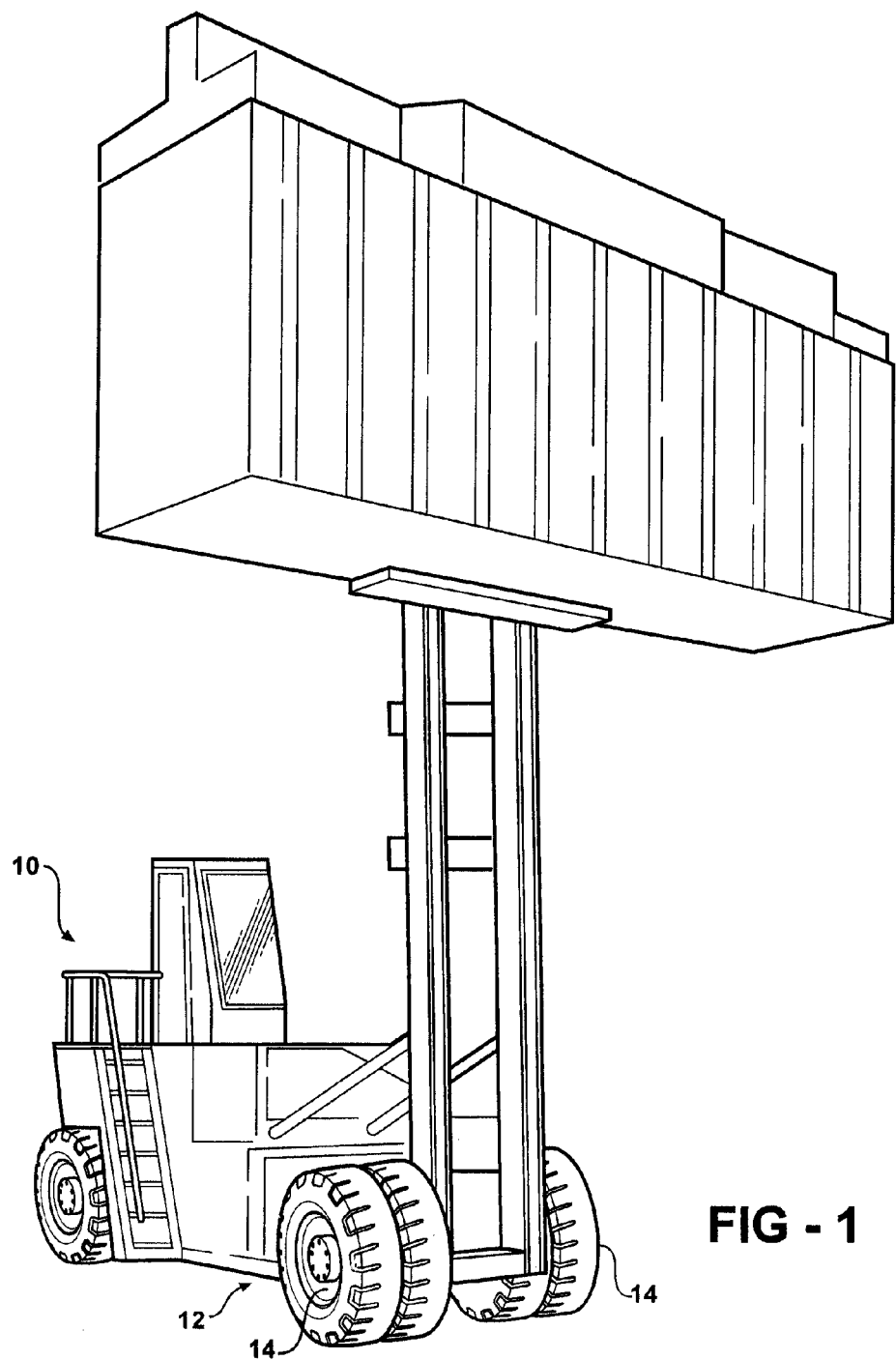
FIG. 1 is a perspective view of a heavy duty lift truck incorporating an axle assembly with a pair of dual wheelends in accordance with the subject invention.

Referring to the Figures, wherein like numerals indicate like or corresponding parts throughout the several views, a heavy duty lift truck 10 incorporating an axle assembly 12 with a pair of dual wheelends 14 in accordance with the subject invention is shown in FIG. 1. Although the axle assembly 12 and dual wheelend 14 of the subject invention is well suited for these types of lift trucks 10 as well as other heavy duty vehicles, it is to be appreciated that the invention is in no way limited to this particular vehicle application.

Turning to FIGS. 2-5, a portion of the axle assembly 12 and the dual wheelend 14 of the subject invention are shown in greater detail. As will become readily apparent, FIGS. 4 and 5, which illustrate the equivalent structure, disclose all of the working components. For illustrative purposes, certain components have been eliminated from FIGS. 2 and 3.

Figure 3:
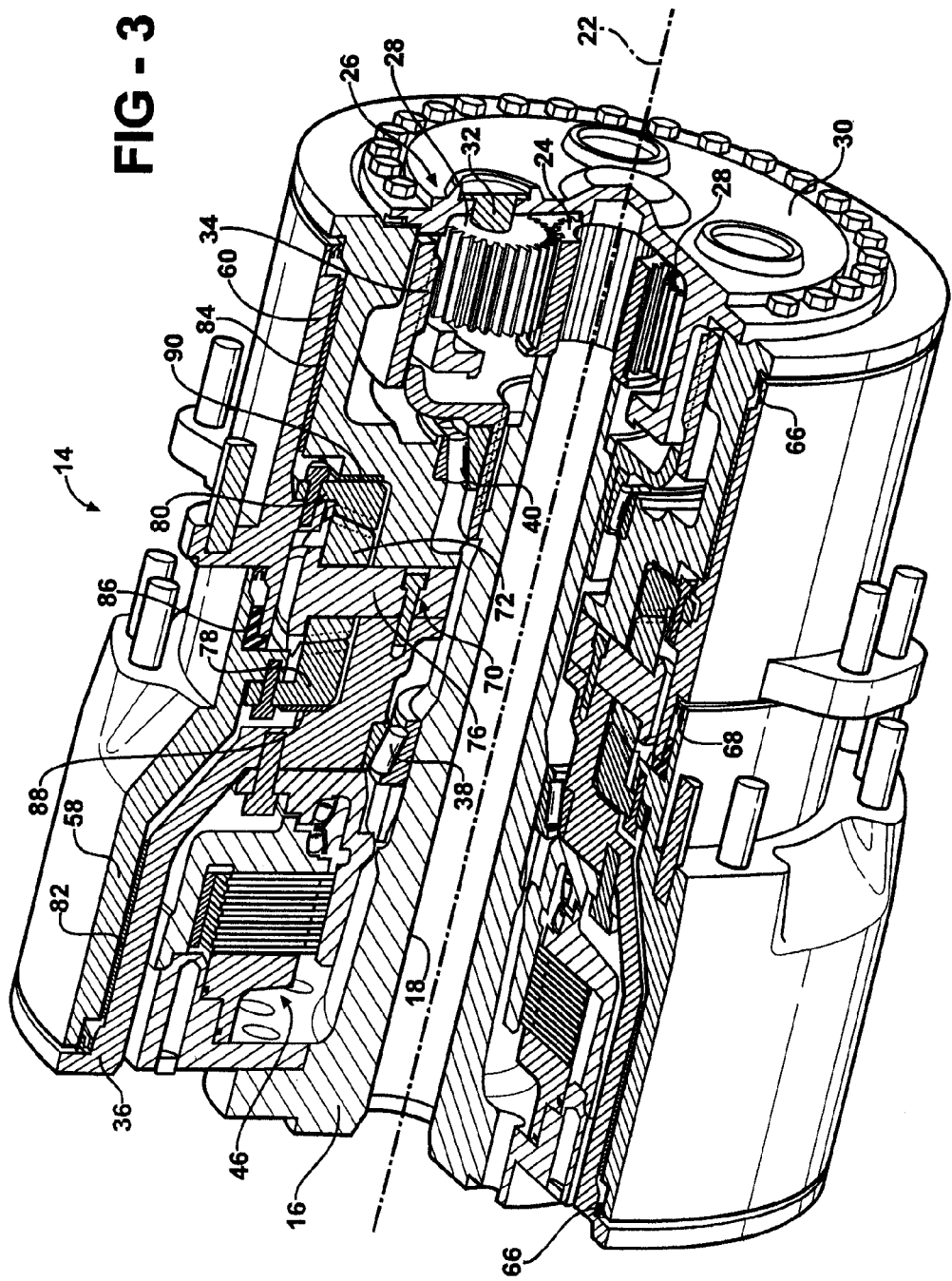
FIG. 3 is a quarter cross-sectional perspective view of the dual wheelend.
Figure 4:
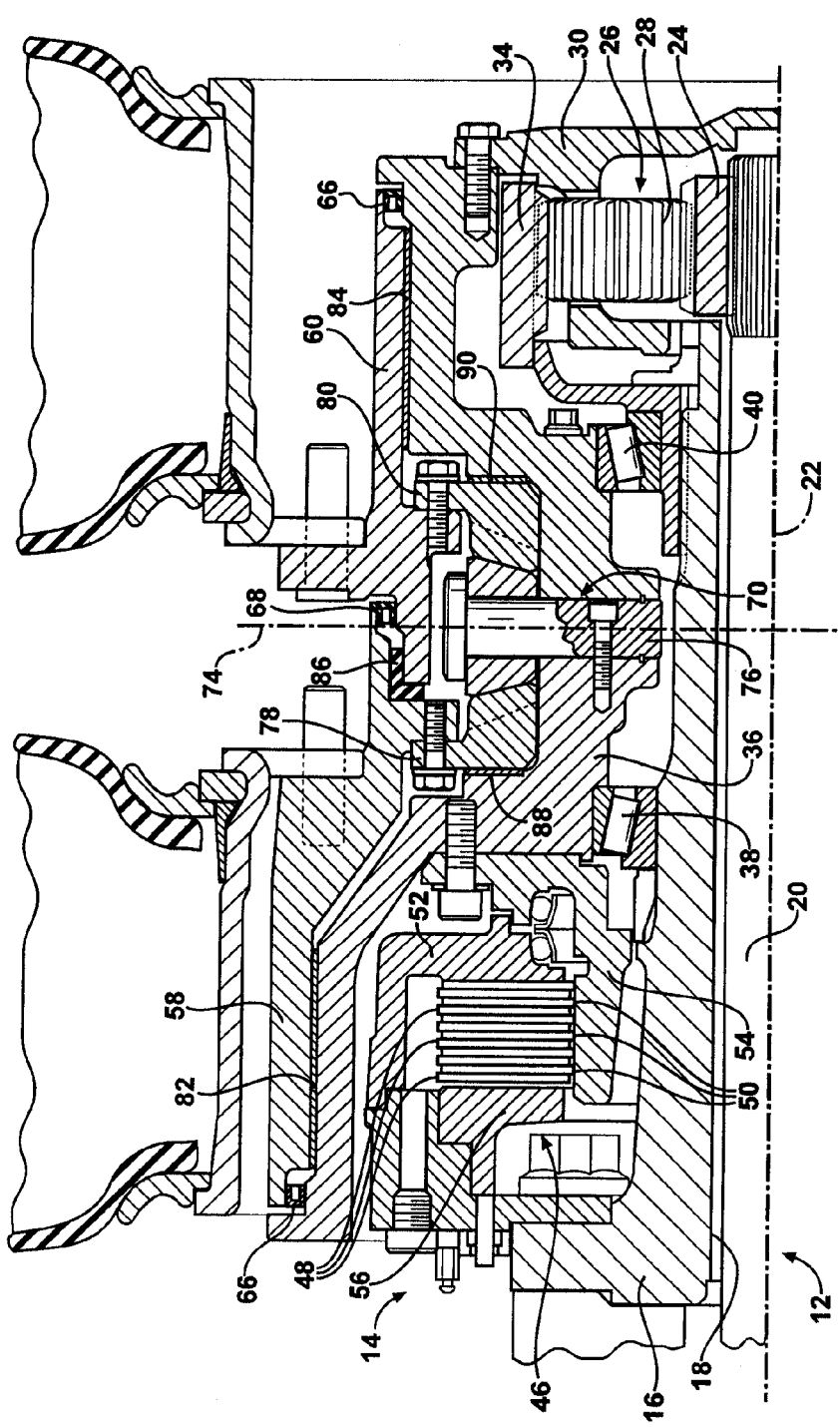
FIG. 4 is a partially cross-sectional side view of the dual wheelend.
Figure 5:
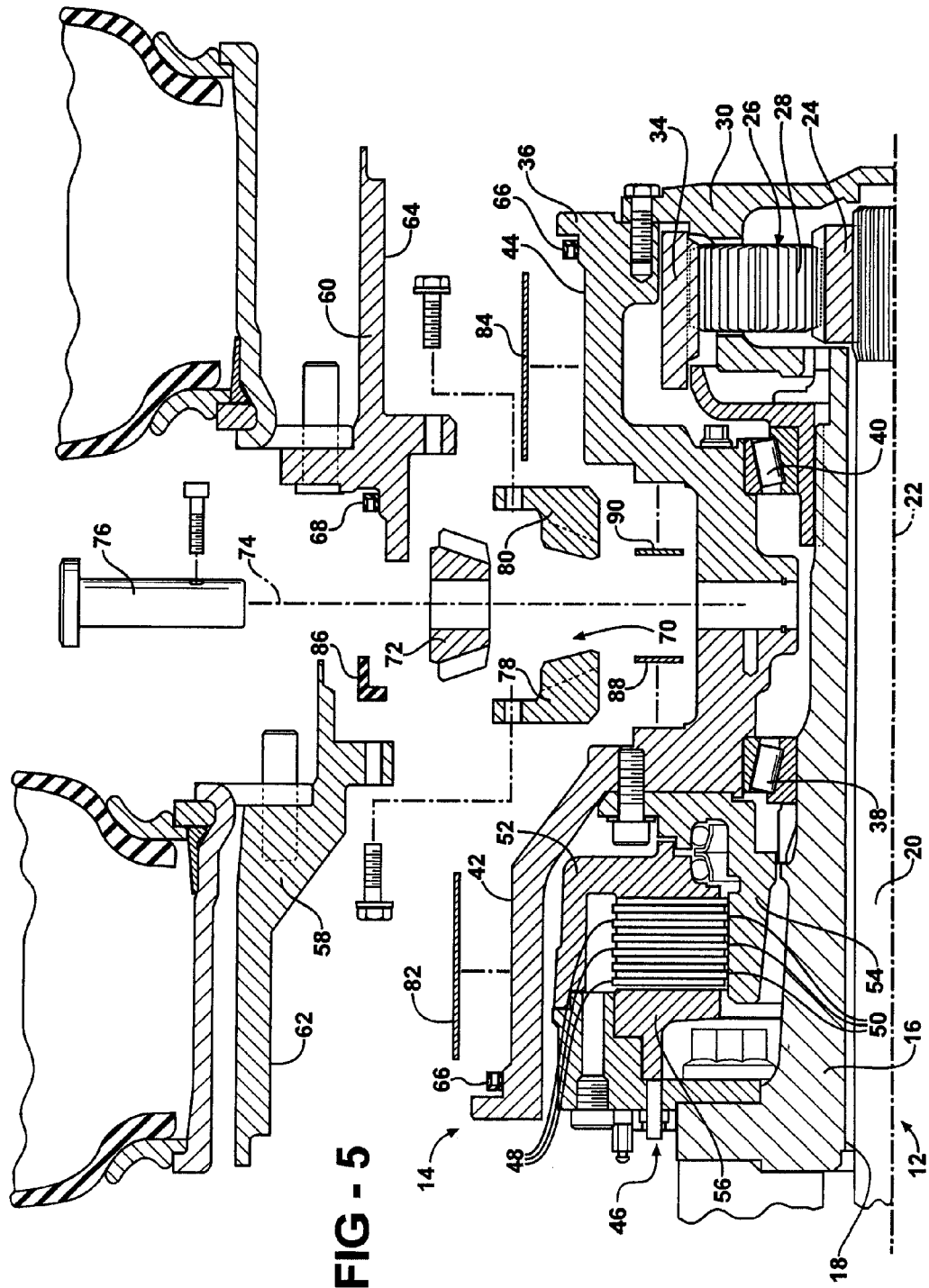
FIG. 5 is a partially cross-sectional side view of the dual wheelend similar to the view of FIG. 4 with some of the components disposed in an exploded relationship.

The axle assembly 12 comprises a stationary spindle 16 defining a central bore 18 and adapted for coupling to the vehicle. As shown in FIGS. 4 and 5, a rotatable axle shaft 20 is disposed within the bore 18 and terminates at a distal end with the axle shaft 20 defining a rotational axis 22. As shown in FIGS. 3-5, a drive gear 24 is mounted to the distal end of the axle shaft 20 for rotation with the axle shaft 20. A gear reduction system 26 is disposed about the drive gear 24 for providing torque multiplication to the dual wheelend 14 when driven by the axle shaft 20. Gear reduction systems of this type are well known to those skilled in the art such that only a brief discussion of the working components follows.

The gear reduction system 26 includes a plurality of planetary gears 28 engaging the drive gear 24 for providing the torque multiplication. A carrier 30, which also operates as a cover for the dual wheelend 14, is provided for supporting the planetary gears 28. Specifically, the carrier 30 includes a plurality of spiders 32 with each planetary gear 28 rotatably supported on a corresponding spider 32. A stationary ring gear 34 is mounted to the spindle 16 for engaging the planetary gears 28. Preferably, the ring gear 34 includes an extension that is splined to the spindle 16 as is known in the art.

An intermediate hub 36 is supported on the spindle 16 and is coupled to the drive gear 24 for rotation about the rotational axis 22 during rotation of the axle shaft 20. Specifically, a plurality of roller bearings 38,40 support the intermediate hub 36 on the spindle 16 for rotation about the rotational axis 22. Even more specifically, a first set of roller bearings 38 is directly mounted about the spindle 16 for supporting a portion of the intermediate hub 36 directly on the spindle 16. A second set of roller bearings 40 is directly mounted about the extension of the ring gear 34 for supporting another portion of the intermediate hub 36 to the spindle 16 through the extension. The intermediate hub 36 is coupled to the drive gear 24 through the gear reduction system 26. Specifically, the carrier 30 is mounted to the intermediate hub 36 such that the multiplied driving force of the planetary gears 28 is transmitted to the intermediate hub 36 to drive the intermediate hub 36 in conjunction with the rotation of the axle shaft 20. Although the intermediate hub 36 may be of any suitable design or configuration, the intermediate hub 36 preferably includes substantially flat first 42 and second 44 exterior surfaces extending substantially parallel with the rotational axis 22 (see FIG. 5). As is discussed in greater detail below, the flat exterior surfaces 42,44 of the intermediate hub 36 are design to support a majority of radial loads transmitted to the dual wheelend 14.

A wet disc brake device 46 is coupled between the spindle 16 and the intermediate hub 36. The wet disc brake device 46 includes first 48 and second 50 sets of friction discs adjacent one another in an alternating relationship defining a running clearance therebetween. The first set of friction discs 48 are coupled to the spindle 16 and in interlocking and sliding relationship relative to the spindle 16. Specifically, the wet disc brake device 46 includes a brake housing 52 secured to the spindle 16 with the first set of friction discs 48 mounted to the brake housing 52. The second set of friction discs 50 are coupled to the intermediate hub 36 and in interlocking and sliding relationship relative to the intermediate hub 36 for rotating relative to the first set of friction discs 48 in conjunction with the intermediate hub 36. Specifically, a flange 54 is mounted to the intermediate hub 36 with the second set of friction discs 50 mounted to the flange 54 for rotation with the intermediate hub 36 relative to the first set of friction discs 48. A fluid is dispersed about the friction discs 48,50 for providing the desired frictional shear forces. A piston 56 is slideably mounted to the brake housing 52 for moving the friction discs 48,50 closer together and causing the desired braking effect. The piston 56 is typically operated through hydraulic pressure. During movement of the friction discs 48,50, the wet disc brake device 46 provides a desired braking force at the wheelend 14. Wet disc brake devices of this type are known to those skilled in the art such that any further discussion of the device is believed unnecessary.

An inner wheel hub 58 is supported on the intermediate hub 36 for rotation about the rotational axis 22. An outer wheel hub 60 is adjacent to the inner wheel hub 58 and is supported on the intermediate hub 36 for rotation about the rotational axis 22. The inner 58 and outer 60 wheel hubs may be of any suitable design or configuration based on a particular application. Preferably, however, the inner wheel hub 58 includes a substantially flat interior surface 62 parallel to and facing the first exterior surface 42 of the intermediate hub 36. Similarly, the outer wheel hub 60 preferably includes a substantially flat interior surface 64 parallel to and facing the second exterior surface 44 of the intermediate hub 36 (see FIG. 5). The inner 58 and outer 60 wheel hubs will each typically include mounting points for supporting a wheel rim, which in turn supports a tire. Again, the mounting points and rim may be of any suitable design or configuration.

A plurality of seals 66,68 are provided to reduce the likelihood of contaminates entering the working components of the wheelend 14. Specifically, hub seals 66 are disposed at the peripheral ends of the wheel hubs 58,60. Also, an intermediate seal 68 is disposed at the intersection of the inner 58 and outer 60 wheel hubs. As illustrated, the seals 66,68 are substantially U-shaped. As is appreciated by those skilled in the art, the seals 66,68 may be of any suitable configuration and may be located throughout the wheelend 14 as needed.

As shown in FIGS. 2-5, a differential mechanism 70 interconnects the inner wheel hub 58 and the outer wheel hub 60. The differential mechanism 70 is at least partially mounted to the intermediate hub 36 for driving both of the wheel hubs 58,60 during rotation of the axle shaft 20 and for permitting relative rotation between the wheel hubs 58,60 relative to the intermediate hub 36 when the vehicle travels in a curved path. In the preferred embodiment, the rotational axis 22 of the axle shaft 20 is further defined as a first rotational axis 22 and the differential mechanism 70 includes a pinion 72 defining a second rotational axis 74 transverse to the first rotational axis 22. The differential mechanism 70 also includes a pin 76 mounted to the intermediate hub 36 along the second rotational axis 74. The pinion 72 is rotatably supported by the pin 76 such that the pinion 72 is rotatable about the second rotational axis 74. The differential mechanism 70 further includes an inner side gear 78 mounted to the inner wheel hub 58 and an outer side gear 80 mounted to the outer wheel hub 60 with each of the side gears 78,80 in meshing engagement with the pinion 72. The inner 78 and outer 80 side gears may be mounted or integrated to their respective wheel hubs 58,60 in any suitable manner. In fact, the alternative embodiments, discussed in greater detail below, disclose other suitable mounting designs.

The dual wheelend 14 includes a number of bearing devices that provide the necessary support for various radial and axial loads. The bearing devices also ensure that the inner wheel hub 58, outer wheel hub 60, side gears 78,80, and pinion 72 are all capable of rotating relative to the intermediate hub 36 without undue wear on these components. Of particular importance, if transferring loads away from the components of the differential mechanism 70. Preferably, the bearing devices are in the form of bushings, which provide the adequate support and rotation capability, but, unlike roller bearings, do not allow virtual non-frictional rotation. Some degree of friction and resistance to rotation is desirable. It is contemplated that the material for some of the bearing devices could include a controlled friction coefficient such that some torque is transmitted between certain components.

Figure 2:
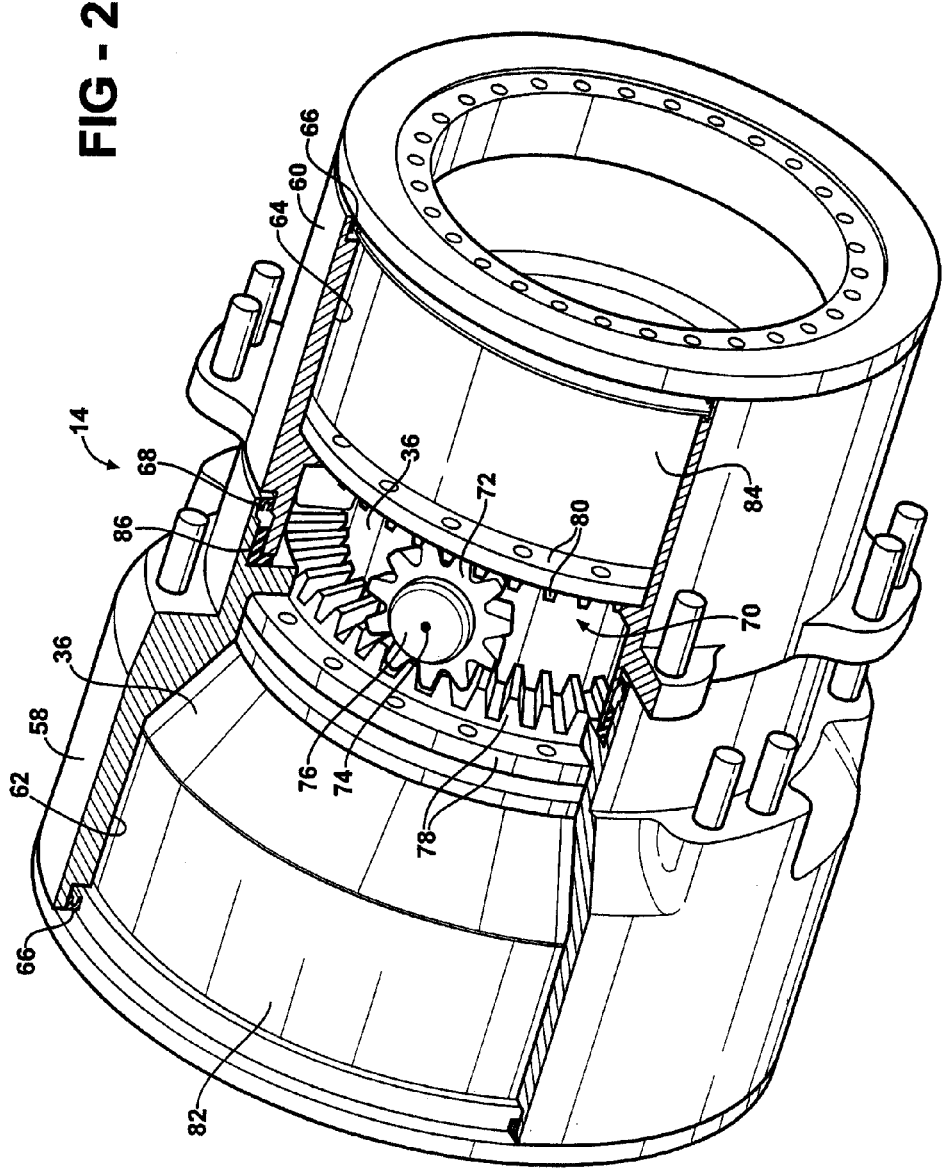
FIG. 2 is a partially cross-sectional perspective view of a dual wheelend in accordance with the subject invention.

One of the bearing devices is an inner hub bushing 82 disposed between the inner wheel hub 58 and the intermediate hub 36. Another of the bearing devices is an outer hub bushing 84 disposed between the outer wheel hub 60 and the intermediate hub 36. Both the inner 58 and outer 60 hub bushings are substantially annular cylinders having a fairly substantial width across the hubs 58,60. Preferably, as best shown in FIGS. 2 and 5, the inner hub 82 bushing is disposed between the interior surface 62 of the inner wheel hub 58 and the first exterior surface 42 of the intermediate hub 36. This inner hub bushing 82 is therefore wide enough to support significant radial loads from the inner wheel hub 58 and transfer these loads into the intermediate hub 36. These radial loads are typically parallel to the second rotational axis 74. Similarly, the outer hub bushing 84 is disposed between the interior surface 64 of the outer wheel hub 60 and the second exterior surface 44 of the intermediate hub 36. This outer hub bushing 84 is also wide enough to support significant radial loads from the outer wheel hub 60 that are substantially parallel to the second rotational axis 74 and transfer these loads into the intermediate hub 36. The inner 82 and outer 84 hub bushings therefore reduce the radial loads being applied to the differential mechanism 70. The inner 82 and outer 84 hub bushings could be formed of a material with a controlled friction coefficient such that some torque is transmitted between the inner 58 and outer 60 wheel hubs and the intermediate hub 36 based on a weight on the rims regardless of the traction available at either tire. As such, there would be a built-in torque level that must be exceeded prior to the inner wheel hub 58 rotating relative to the outer wheel hub 60. Alternatively, the wheelend 14 may be dimensionally preloaded to create a built-in torque that must be exceeded prior to the inner wheel hub 58 rotating relative to the outer wheel hub 60. As is appreciated by those skilled in the art, the inner 82 and outer 84 hub bushings may be of any suitable material and may be of a variety of configurations based on the particular wheelhub application.

Another of the bearing devices is an intermediate hub bushing 86 mounted between the inner 58 and outer 60 wheel hubs. The intermediate hub bushing 86 is configured to axially and radially engage the wheel hubs 58,60 relative to the rotational axes 22,74 to support axial and radial loads between the inner 58 and outer 60 wheel hubs. Preferably, the intermediate hub bushing 86 is substantially annular and has an L-shaped configuration when viewed in cross-section. It should be appreciated, that the intermediate hub bushing 86 may be of any suitable configuration.

As best shown in FIGS. 3-5, yet another of the bearing devices is at least one differential bushing 88,90 disposed between the differential mechanism 70 and the intermediate hub 36. In the preferred embodiment, the differential bushing 88,90 is substantially aligned with the second rotational axis 74 for supporting axial loads substantially parallel to the first rotational axis 22. Preferably, the at least one differential bushing 88,90 includes a plurality of differential bushings 88,90 and are further defined as an inner differential bushing 88 and an outer differential bushing 90. Even more preferably, the inner differential bushing 88 is preferably disposed between the inner side gear 78 and the intermediate hub 36. Similarly, the outer differential bushing 90 is disposed between the outer side gear 80 and the intermediate hub 36. As with the other bushings, the inner 88 and outer 90 differential bushings are substantially annular such that the differential bushings 88,90 extend around the entire circumference of the wheelend 14.

Figure 6:
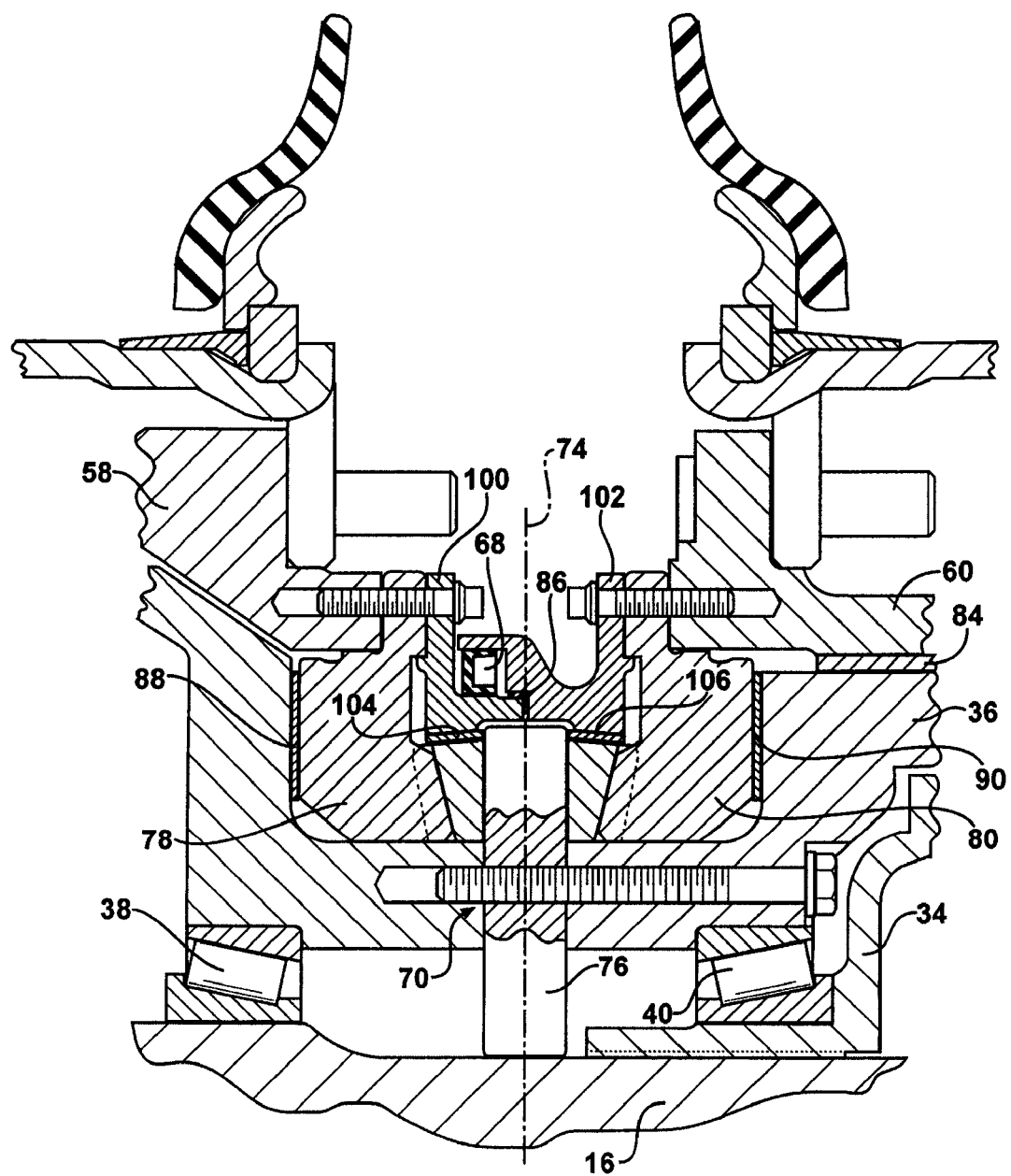
FIG. 6 is a partially cross-sectional side view of an alternative embodiment of the dual wheelend.
Figure 7:
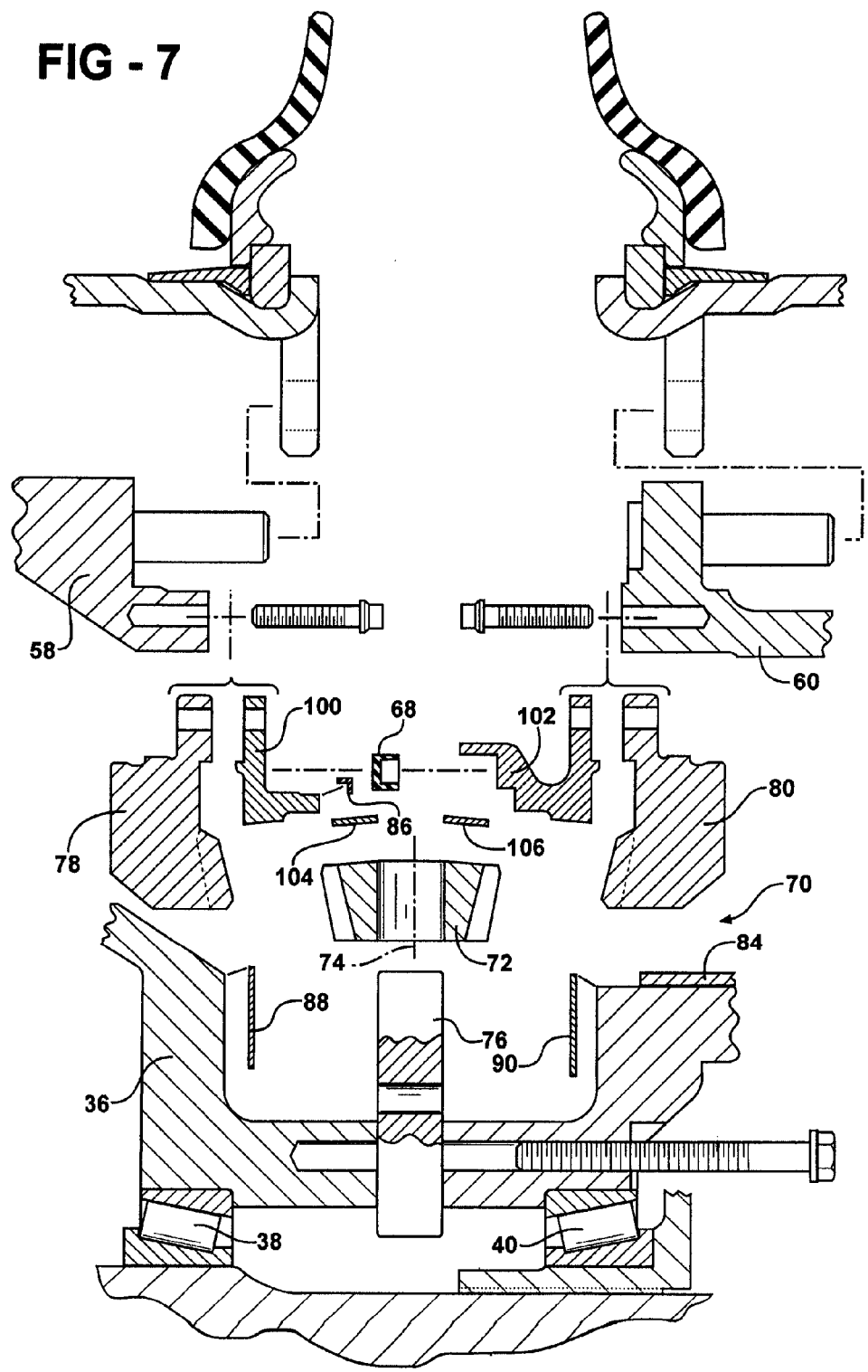
FIG. 7 is a is a partially cross-sectional side view of the alternative dual wheelend of FIG. 6 with some of the components disposed in an exploded relationship.

Turning to FIGS. 6 and 7, an alternative embodiment of the dual wheelend 14 is shown. Many of the components of this alternative dual wheelend 14 are the same as the components discussed above. The primary difference relates to the interface between the inner 58 and outer 60 wheel hubs and the differential mechanism 70. In particular, an inner hub support 100 is coupled between the inner wheel hub 58 and the pinion 72. Similarly, an outer hub support 102 is coupled between the outer wheel hub 60 and the pinion 72. In the preferred embodiment, the inner hub support 100 is mounted to the inner side gear 78 and the outer hub support 102 is mounted to the outer side gear 80. The inner 100 and outer 102 hub supports are designed to further support radial loads substantially parallel to the second rotational axis 74. Preferably, the inner hub support 100 is bolted to the inner side gear 78 through a plurality of common fasteners. Similarly, the outer hub support 80 is bolted to the outer side gear 80 through a plurality of common fasteners.

The intermediate hub bushing 86, which was previously disposed between the inner 58 and outer 60 wheel hubs, is now mounted between the inner 100 and outer 102 hub supports. The intermediate hub bushing 86 axially and radially engages the hub supports 100,102 relative to the rotational axes 22,74 to continue to support axial and radial loads between the inner 58 and outer 60 wheel hubs. Similarly, the intermediate seal 68 is now mounted between the inner 100 and outer 102 hub supports.

An additional bearing device is provided on this alternative embodiment. In particular, an inner support bushing 104 is disposed between the inner hub support 100 and the pinion 72. Similarly, an outer support bushing 106 is disposed between the outer hub support 102 and the pinion 72. The inner 104 and outer 105 support bushings support radial loads substantially parallel to the second rotational axis 74 and are provided to further distribute the loads applied to the wheelend 14. As with the other bushings, the inner 104 and outer 106 support bushings are substantially annular to encompass the wheelend 14.

Figure 8:
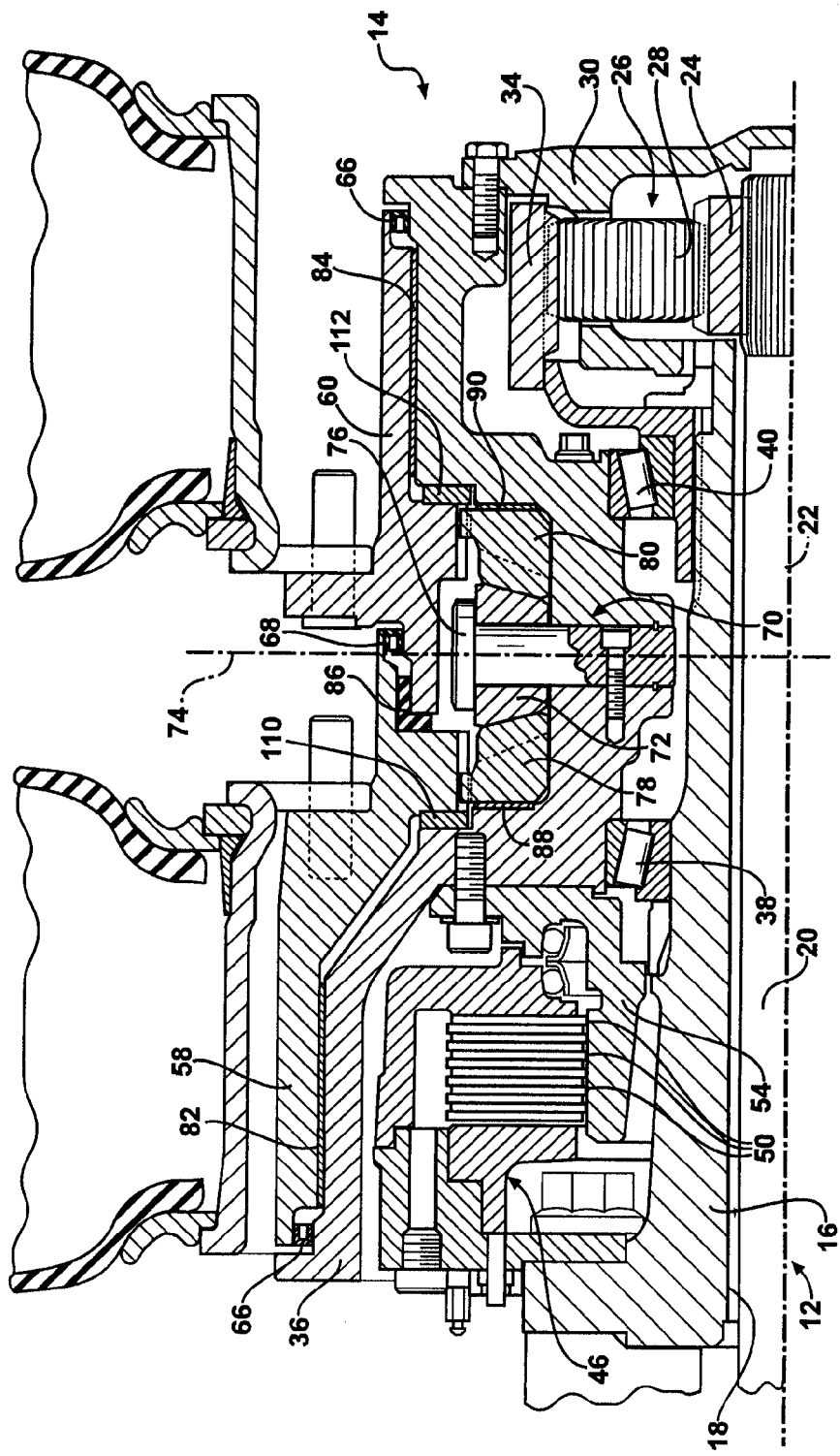
FIG. 8 is a partially cross-sectional side view of another alternative embodiment of the dual wheelend.
Figure 9:
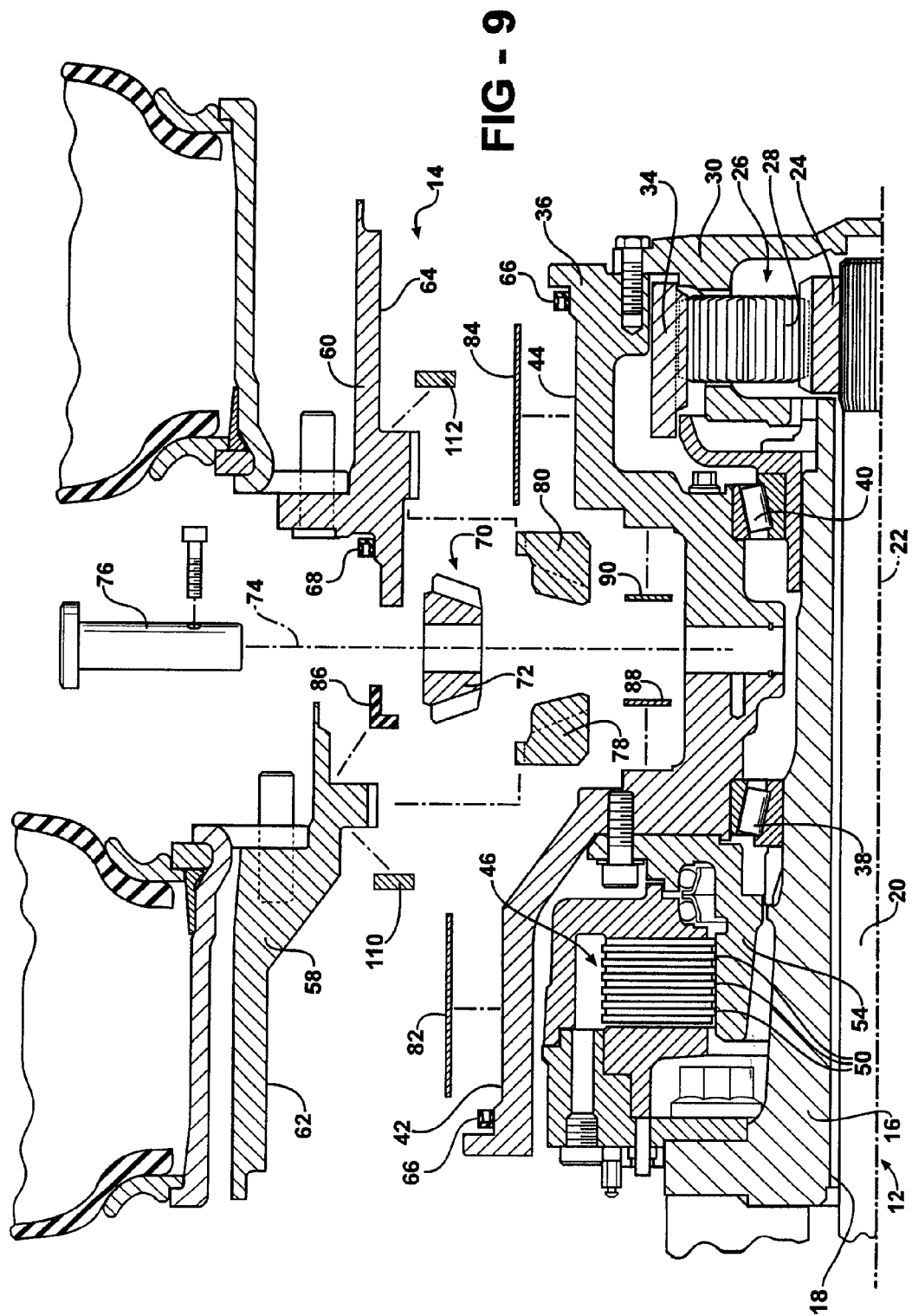
FIG. 9 is a partially cross-sectional side view of the alternative dual wheelend of FIG. 8 with some of the components disposed in an exploded relationship.

Turning to FIGS. 8 and 9, yet another embodiment of the dual wheelend 14 is shown. Again, this alternative wheelend 14 shares many of the same components as discussed above. The primary difference relates to the interface between the differential mechanism 70 and the wheel hubs 58,60. In particular, the inner side gear 78 is now splined to the inner wheel hub 58 such that the inner side gear 78 is capable of moving or floating relative to the inner wheel hub 58. Similarly, the outer side gear 80 is now splined to the outer wheel hub 60 such that the outer side gear 80 is also capable of moving or floating relative to the outer wheel hub 60. The inner differential bushing 88 is disposed between the splined inner side gear 78 and the intermediate hub 36 for supporting axial loads as discussed above. Similarly, the outer differential bushing 90 is disposed between the splined outer side gear 80 and the intermediate hub 36 for supporting axial loads as discussed above.

To further reduce the loads applied to the differential mechanism 70, this alternative wheelend 14 provides yet another bearing device. Specifically, an inner hub bearing member 110 is mounted between the inner wheel hub 58 and the intermediate hub 36 in proximity to the differential mechanism 70. The inner hub bearing member 110 supports at least one of axial and radial loads between the inner wheel hub 58 and the intermediate hub 36. Similarly, an outer hub bearing member 112 is mounted between the outer wheel hub 60 and the intermediate hub 36 in proximity to the differential mechanism 70. Likewise, the outer hub bearing member 112 supports at least one of axial and radial loads between the outer wheel hub 60 and the intermediate hub 36. The inner 110 and outer 112 hub bearing members are preferably formed as bushings for minimizing the loads applied to the side gears 78,80 such that the side gears 78,80 are free to move or float relative to the wheel hubs 58,60. In a similar fashion as the inner 88 and outer 90 differential bushings, the inner 110 and outer 112 hub bearing members are preferably annular and substantially parallel with the second rotational axis 74 such that these bearing members can support axial loads between the wheel hubs 58,60 and the intermediate hub 36. The incorporation of the inner 110 and outer 112 hub bearing members significantly reduces the axial loads being applied to the differential mechanism 70 by transferring these loads around the differential mechanism 70 and into the intermediate hub 36. As discussed above, the inner 82 and outer 84 hub bushings significantly reduce the radial loads being applied to the differential mechanism 70. This transferring of loads greatly increases the wearable life of the differential mechanism 70. It should be appreciated that the bearing members 110,112 may be of any suitable design or configuration so long as the desired loads are being supported.

Figure 10:
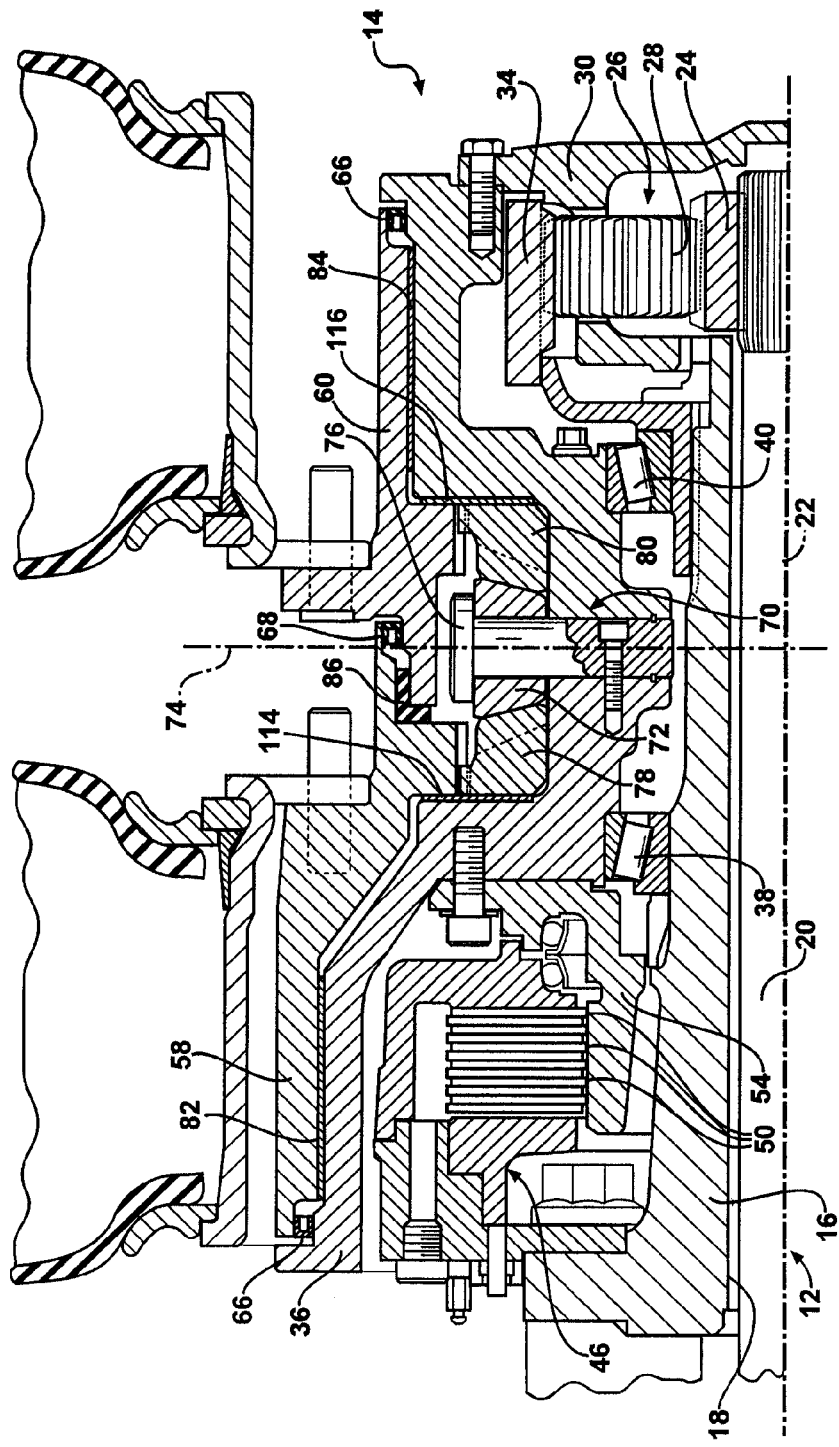
FIG. 10 is a partially cross-sectional side view of yet another alternative embodiment of the dual wheelend.
Figure 11:
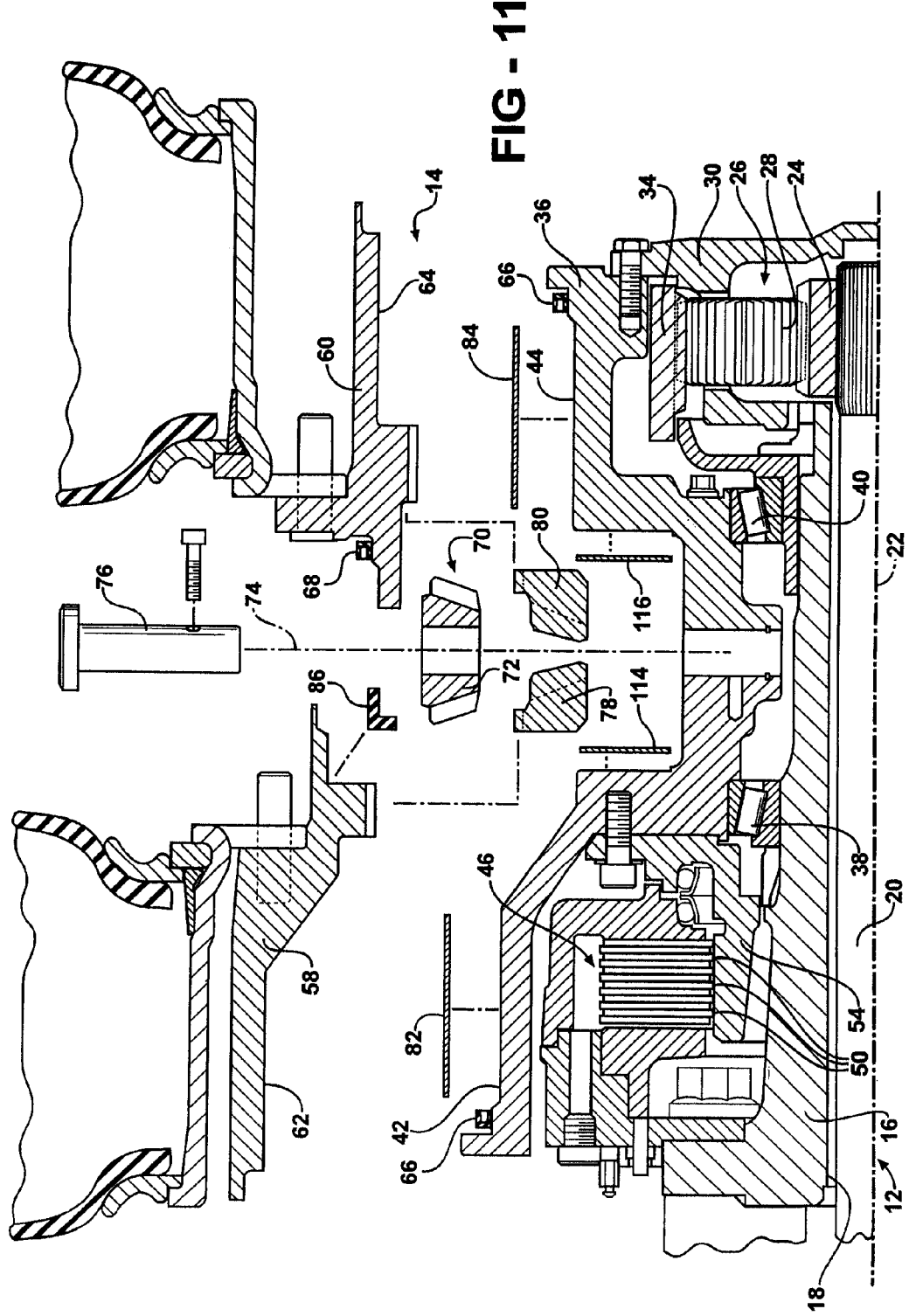
FIG. 11 is a partially cross-sectional side view of the alternative dual wheelend of FIG. 10 with some of the components disposed in an exploded relationship.

Turning to FIGS. 10 and 11, another embodiment of the dual wheelend 14 is shown. This alternative wheelend 14 shares many of the same components as the wheelend shown in FIGS. 8 and 9, including the splined side gears 78, 80. The primary difference is that this embodiment contemplates alternative inner 114 and outer 116 differential bushings, which are in essence reconfigured. In particular, to further reduce the loads applied to the differential mechanism 70 and to reduce the number of parts required, this alternative wheelend 14 integrates two pairs bushings shown in FIGS. 8 and 9 into a single pair of bushings. Specifically, inner differential bushing 114 extends substantially parallel to the second rotational axis 74 beyond the inner side gear 78 for supporting axial loads between the intermediate hub 36 and both of the inner side gear 78 and the inner wheel hub 58. Hence, the inner differential bushing 114 is providing a dual purpose. Similarly, outer differential bushing 116 extends substantially parallel to the second rotational axis 74 beyond the outer side gear 80 for supporting axial loads between the intermediate hub 36 and both of the outer side gear 80 and the outer wheel hub 60 for also providing a dual purpose. As should be well appreciated by those skilled in the art, the inner 114 and outer 116 differential bushings may be of any suitable design or configuration to accommodate any suitable configuration of the intermediate wheel hub 36 and/or the side gears 78, 80 and/or the wheel hubs 58, 60.

The invention has been described in an illustrative manner, and it is to be understood that the terminology which has been used is intended to be in the nature of words of description rather that of limitation. As is now apparent to those skilled in the art, many modifications and variations of the present invention are possible in light of the above teachings. It is, therefore, to be understood that within the scope of the appended claims the invention may be practiced otherwise than specifically described.

What is claimed is:

1. An axle assembly for a vehicle, said assembly comprising:
    a stationary spindle defining a central bore and adapted for coupling to the vehicle;
    a rotatable axle shaft disposed within said bore and terminating at a distal end with said axle shaft defining a rotational axis;
    a drive gear mounted to said distal end of said axle shaft for rotation with said axle shaft;
    an intermediate hub supported on said spindle and coupled to said drive gear for rotation about said rotational axis during rotation of said axle shaft;
    an inner wheel hub supported on said intermediate hub for rotation about said rotational axis;
    an outer wheel hub adjacent to said inner wheel hub and supported on said intermediate hub for rotation about said rotational axis;
    a differential mechanism interconnecting said inner wheel hub and said outer wheel hub with said differential mechanism at least partially mounted to said intermediate hub for driving both of said wheel hubs during rotation of said axle shaft and for permitting relative rotation between said wheel hubs relative to said intermediate hub when the vehicle travels in a curved path;
    a gear reduction system interconnecting said intermediate hub and said drive gear for providing torque multiplication to said wheel hubs when driven by said axle shaft; and
    a wet disc brake device is coupled between said spindle and said intermediate hub with said wet disc brake device including first and second sets of friction discs adjacent one another in an alternating relationship defining a running clearance therebetween with said first set of friction discs coupled to said spindle and in interlocking and sliding relationship relative to said spindle and said second set of friction discs coupled to said intermediate hub and in interlocking and sliding relationship relative to said intermediate hub for rotating relative to said first set of friction discs in conjunction with said intermediate hub.

2. An assembly as set forth in claim 1 wherein said wet disc brake device includes a brake housing secured to said spindle with said first set of friction discs mounted to said brake housing.

3. An assembly as set forth in claim 2 further including a flange mounted to said intermediate hub with said second set of friction discs mounted to said flange for rotation with said intermediate hub relative to said first set of friction discs.

4. An assembly as set forth in claim 1 wherein said gear reduction system includes a plurality of planetary gears engaging said drive gear and coupled to said intermediate hub for providing said torque multiplication.

5. An assembly as set forth in claim 4 wherein said gear reduction system includes a carrier mounted to said intermediate hub with said planetary gears rotatably supported on said carrier.

6. An assembly as set forth in claim 5 wherein said gear reduction system includes a stationary ring gear mounted to said spindle for engaging said planetary gears.

7. An assembly as set forth in claim 1 wherein said rotational axis of said axle shaft is further defined as a first rotational axis and said differential mechanism including a pinion defining a second rotational axis transverse to said first rotational axis with said pinion rotatable about said second rotational axis.

8. An assembly as set forth in claim 7 wherein said differential mechanism includes a pin mounted to said intermediate hub with said pinion rotatably supported by said pin.

9. An assembly as set forth in claim 8 wherein said differential mechanism includes an inner side gear mounted to said inner wheel hub and an outer side gear mounted to said outer wheel hub with each of said side gears in meshing engagement with said pinion.

10. An assembly as set forth in claim 9 further including an inner differential bushing disposed between said inner side gear and said intermediate hub and an outer differential bushing disposed between said outer side gear and said intermediate hub.

11. An assembly as set forth in claim 9 further including an inner hub support mounted to said inner side gear and coupled to said pinion and an outer hub support mounted to said outer side gear and coupled to said pinion for supporting radial loads substantially parallel to said second rotational axis.

12. An assembly as set forth in claim 11 further including an inner support bushing disposed between said inner hub support and said pinion and an outer support bushing disposed between said outer hub support and said pinion for supporting radial loads substantially parallel to said second rotational axis.

13. An assembly as set forth in claim 12 further including an intermediate hub bushing mounted between said inner and outer hub supports and axially and radially engaging said hub supports relative to said rotational axis to support axial and radial loads between said inner and outer wheel hubs.

14. An assembly as set forth in claim 9 wherein said inner side gear is splined to said inner wheel hub and an outer side gear is splined to said outer wheel hub.

15. An assembly as set forth in claim 14 further including an inner hub bearing member mounted between said inner wheel hub and said intermediate hub in proximity to said differential mechanism for supporting at least one of axial and radial loads between said inner wheel hub and said intermediate hub and further including an outer hub bearing member mounted between said outer wheel hub and said intermediate hub in proximity to said differential mechanism for supporting at least one of axial and radial loads between said outer wheel hub and said intermediate hub.

16. An assembly as set forth in claim 1 further including an inner hub bushing disposed between said inner wheel hub and said intermediate hub and an outer hub bushing disposed between said outer wheel hub and said intermediate hub.

17. An assembly as set forth in claim 16 wherein said intermediate hub includes substantially flat first and second exterior surfaces extending substantially parallel with said rotational axis and wherein said inner wheel hub includes a substantially flat interior surface parallel to and facing said first exterior surface with said inner hub bushing disposed between said interior surface of said inner wheel hub and said first exterior surface, and wherein said outer wheel hub includes a substantially flat interior surface parallel to and facing said second exterior surface with said outer hub bushing disposed between said interior surface of said outer wheel hub and said second exterior surface for supporting radial loads substantially transverse to said rotational axis.

18. An assembly as set forth in claim 1 further including an intermediate hub bushing mounted between said inner and outer wheel hubs and axially and radially engaging said wheel hubs relative to said rotational axis to support axial and radial loads between said inner and outer wheel hubs.

19. An assembly as set forth in claim 1 further including a plurality of roller bearings supporting said intermediate hub on said spindle for rotation about said rotational axis.

20. A dual wheelend for an axle assembly of a heavy vehicle with the axle assembly having a rotatable axle shaft, said wheelend comprising:
 a stationary spindle defining a central bore and a first rotational axis with said spindle adapted for coupling to the vehicle;
 an intermediate hub supported on said spindle for rotation about said first rotational axis during rotation of the axle shaft;
 an inner wheel hub supported on said intermediate hub for rotation about said first rotational axis;
 an outer wheel hub adjacent to said inner wheel hub and supported on said intermediate hub for rotation about said first rotational axis;
 a differential mechanism interconnecting said inner wheel hub and said outer wheel hub with said differential mechanism defining a second rotational axis transverse to said first rotational axis and at least partially mounted to said intermediate hub for driving both of said wheel hubs during rotation of the axle shaft and for permitting relative rotation between said wheel hubs relative to said intermediate hub when the vehicle travels in a curved path; and
 at least one differential bushing disposed between said differential mechanism and said intermediate hub with said differential bushing substantially aligned with said second rotational axis for supporting axial loads substantially parallel to said first rotational axis.

21. A dual wheelend as set forth in claim 20 wherein said at least one differential bushing includes a plurality of differential bushings further defined as an inner differential bushing and an outer differential bushing.

22. A dual wheelend as set forth in claim 21 wherein said differential mechanism includes an inner side gear mounted to said inner wheel hub and an outer side gear mounted to said outer wheel hub with said inner differential bushing disposed between said inner side gear and said intermediate hub and said outer differential bushing disposed between said outer side gear and said intermediate hub.

23. A dual wheelend as set forth in claim 22 wherein said differential mechanism includes a pinion rotatable about said second rotational axis with each of said side gears in meshing engagement with said pinion.

24. A dual wheelend as set forth in claim 23 wherein said differential mechanism includes a pin mounted to said intermediate hub with said pinion rotatably supported by said pin.

25. A dual wheelend as set forth in claim 20 further including an inner hub bushing disposed between said inner wheel hub and said intermediate hub and an outer hub bushing disposed between said outer wheel hub and said intermediate hub.

26. A dual wheelend as set forth in claim 25 wherein said intermediate hub includes substantially flat first and second exterior surfaces extending substantially parallel with said first rotational axis and wherein said inner wheel hub includes a substantially flat interior surface parallel to and facing said first exterior surface with said inner hub bushing disposed between said interior surface of said inner wheel hub and said first exterior surface, and wherein said outer wheel hub includes a substantially flat interior surface parallel to and facing said second exterior surface with said outer hub bushing disposed between said interior surface of said outer wheel hub and said second exterior surface for supporting radial loads substantially parallel to said second rotational axis.

27. A dual wheelend as set forth in claim 20 further including an intermediate hub bushing mounted between said inner and outer wheel hubs and axially and radially engaging said wheel hubs relative to said first rotational axis to support axial and radial loads between said inner and outer wheel hubs.

28. A dual wheelend as set forth in claim 20 further including a plurality of roller bearings supporting said intermediate hub on said spindle for rotation about said first rotational axis.

29. A dual wheelend as set forth in claim 20 wherein said differential mechanism includes an inner side gear mounted to said inner wheel hub and an outer side gear mounted to said outer wheel hub and a pinion rotatable about said second rotational axis with each of said side gears in meshing engagement with said pinion.

30. A dual wheelend as set forth in claim 29 further including an inner hub support coupled between said inner wheel hub and said pinion and an outer hub support coupled between said outer wheel hub and said pinion for supporting radial loads substantially parallel to said second rotational axis.

31. A dual wheelend as set forth in claim 30 wherein said inner hub support is mounted to said inner side gear and said outer hub support is mounted to said outer side gear.

32. A dual wheelend as set forth in claim 30 further including an inner support bushing disposed between said inner hub support and said pinion and an outer support bushing disposed between said outer hub support and said pinion for supporting radial loads substantially parallel to said second rotational axis.

33. A dual wheelend as set forth in claim 32 further including an intermediate hub bushing mounted between said inner and outer hub supports and axially and radially engaging said hub supports relative to said rotational axis to support axial and radial loads between said inner and outer wheel hubs.

34. A dual wheelend as set forth in claim 29 wherein said inner side gear is splined to said inner wheel hub and an outer side gear is splined to said outer wheel hub and wherein said at least one differential bushing includes a plurality of differential bushings further defined as an inner differential bushing and an outer differential bushing with said inner differential bushing disposed between said inner side gear and said intermediate hub and said outer differential bushing disposed between said outer side gear and said intermediate hub.

35. A dual wheelend as set forth in claim 34 further including an inner hub bearing member mounted between said inner wheel hub and said intermediate hub in proximity to said differential mechanism for supporting at least one of axial and radial loads between said inner wheel hub and said intermediate hub and further including an outer hub bearing member mounted between said outer wheel hub and said intermediate hub in proximity to said differential mechanism for supporting at least one of axial and radial loads between said outer wheel hub and said intermediate hub.

36. A dual wheelend as set forth in claim 34 wherein said inner differential bushing extends substantially parallel to said second rotational axis beyond said inner side gear for supporting axial loads between said intermediate hub and both of said inner side gear and said inner wheel hub and wherein said outer differential bushing extends substantially parallel to said second rotational axis beyond said outer side gear for supporting axial loads between said intermediate hub and both of said outer side gear and said outer wheel hub.

37. A dual wheelend comprising:
an intermediate hub defining a first rotational axis with said intermediate hub rotatable about said first rotational axis;
an inner wheel hub supported on said intermediate hub for rotation about said first rotational axis;
an outer wheel hub adjacent to said inner wheel hub and supported on said intermediate hub for rotation about said first rotational axis;
a differential mechanism interconnecting said inner wheel hub and said outer wheel hub with said differential mechanism defining a second rotational axis transverse to said first rotational axis and at least partially mounted to said intermediate hub for driving both of said wheel hubs in conjunction with said rotation of said intermediate hub and for permitting relative rotation between said wheel hubs relative to said intermediate hub; and
at least one differential bushing disposed between said differential mechanism and said intermediate hub with said differential bushing substantially aligned with said second rotational axis for supporting axial loads substantially parallel to said first rotational axis.

38. A dual wheelend as set forth in claim 37 wherein said differential mechanism includes an inner side gear mounted to said inner wheel hub and an outer side gear mounted to said outer wheel hub and wherein said at least one differential bushing includes a plurality of differential bushings further defined as an inner differential bushing and an outer differential bushing with said inner differential bushing disposed between said inner side gear and said intermediate hub and said outer differential bushing disposed between said outer side gear and said intermediate hub.

39. A dual wheelend as set forth in claim 38 wherein said differential mechanism includes a pinion rotatable about said second rotational axis with each of said side gears in meshing engagement with said pinion and wherein said differential mechanism includes a pin mounted to said intermediate hub with said pinion rotatably supported by said pin.

40. A dual wheelend as set forth in claim 37 further including an inner hub bushing disposed between said inner wheel hub and said intermediate hub and an outer hub bushing disposed between said outer wheel hub and said intermediate hub.

41. A dual wheelend as set forth in claim 40 wherein said intermediate hub includes substantially flat first and second exterior surfaces extending substantially parallel with said first rotational axis and wherein said inner wheel hub includes a substantially flat interior surface parallel to and facing said first exterior surface with said inner hub bushing disposed between said interior surface of said inner wheel hub and said first exterior surface, and wherein said outer wheel hub includes a substantially flat interior surface facing parallel to and facing said second exterior surface with said outer hub bushing disposed between said interior surface of said outer wheel hub and said second exterior surface for supporting radial loads substantially parallel to said second rotational axis.

42. A dual wheelend as set forth in claim 37 further including an intermediate hub bushing mounted between said inner and outer wheel hubs and axially and radially engaging said wheel hubs relative to said first rotational axis to support axial and radial loads between said inner and outer wheel hubs.

43. A dual wheelend as set forth in claim 38 further including an inner hub support mounted to said inner side gear and coupled to said pinion and an outer hub support mounted to said outer side gear and coupled to said pinion for supporting radial loads substantially parallel to said second rotational axis.

44. A dual wheelend as set forth in claim 43 further including an inner support bushing disposed between said inner hub support and said pinion and an outer support bushing disposed between said outer hub support and said pinion for supporting said radial loads substantially parallel to said second rotational axis.

45. A dual wheelend as set forth in claim 44 further including an intermediate hub bushing mounted between said inner and outer hub supports and axially and radially engaging said hub supports relative to said rotational axis to support axial and radial loads between said inner and outer wheel hubs.

46. A dual wheelend as set forth in claim 37 wherein said differential mechanism includes an inner side gear splined to said inner wheel hub and an outer side gear splined to said outer wheel hub and wherein said at least one differential bushing includes a plurality of differential bushings further defined as an inner differential bushing and an outer differential bushing with said inner differential bushing disposed between said inner side gear and said intermediate hub and said outer differential bushing disposed between said outer side gear and said intermediate hub.

47. A dual wheelend as set forth in claim 46 further including an inner hub bearing member mounted between said inner wheel hub and said intermediate hub in proximity to said differential mechanism for supporting at least one of axial and radial loads between said inner wheel hub and said intermediate hub and further including an outer hub bearing member mounted between said outer wheel hub and said intermediate hub in proximity to said differential mechanism for supporting at least one of axial and radial loads between said outer wheel hub and said intermediate hub.

48. A dual wheelend as set forth in claim 46 wherein said inner differential bushing extends substantially parallel to said second rotational axis beyond said inner side gear for supporting axial loads between said intermediate hub and both of said inner side gear and said inner wheel hub and wherein said outer differential bushing extends substantially parallel to said second rotational axis beyond said outer side gear for supporting axial loads between said intermediate hub and both of said outer side gear and said outer wheel hub.

49. An axle assembly for a vehicle, said assembly comprising:
a stationary spindle defining a central bore and adapted for coupling to the vehicle;
a rotatable axle shaft disposed within said bore and terminating at a distal end with said axle shaft defining a rotational axis;
a drive gear mounted to said distal end of said axle shaft for rotation with said axle shaft;
an intermediate hub supported on said spindle and coupled to said drive gear for rotation about said rotational axis during rotation of said axle shaft;
an inner wheel hub supported on said intermediate hub for rotation about said rotational axis;
an outer wheel hub adjacent to said inner wheel hub and supported on said intermediate hub for rotation about said rotational axis; and
a differential mechanism interconnecting said inner wheel hub and said outer wheel hub with said differential mechanism at least partially mounted to said intermediate hub for driving both of said wheel hubs during rotation of said axle shaft and for permitting relative rotation between said wheel hubs relative to said intermediate hub when the vehicle travels in a curved path.

50. An assembly as set forth in claim 49 further including a gear reduction system interconnecting said intermediate hub and said drive gear for providing torque multiplication to said wheel hubs when driven by said axle shaft.

51. An assembly as set forth in claim 50 wherein said gear reduction system includes a plurality of planetary gears engaging said drive gear and coupled to said intermediate hub for providing said torque multiplication.

52. An assembly as set forth in claim 51 wherein said gear reduction system includes a carrier mounted to said intermediate hub with said planetary gears rotatably supported on said carrier.

53. An assembly as set forth in claim 52 wherein said gear reduction system includes a stationary ring gear mounted to said spindle for engaging said planetary gears.

54. An assembly as set forth in claim 49 wherein said rotational axis of said axle shaft is further defined as a first rotational axis and said differential mechanism includes a pin mounted to said intermediate hub and a pinion rotatably supported by said pin defining a second rotational axis transverse to said first rotational axis with said pinion rotatable about said second rotational axis.

55. An assembly as set forth in claim 54 wherein said differential mechanism includes an inner side gear mounted to said inner wheel hub and an outer side gear mounted to said outer wheel hub with each of said side gears in meshing engagement with said pinion.

56. An assembly as set forth in claim 55 further including an inner differential bushing disposed between said inner side gear and said intermediate hub and an outer differential bushing disposed between said outer side gear and said intermediate hub.

57. An assembly as set forth in claim 49 further including an inner hub bushing disposed between said inner wheel hub and said intermediate hub and an outer hub bushing disposed between said outer wheel hub and said intermediate hub.

* * * * *